US009651184B2

(12) United States Patent
Crombie et al.

(10) Patent No.: US 9,651,184 B2
(45) Date of Patent: May 16, 2017

(54) WIRELESS MODULES WITH POWER CONTROL CIRCUITS FOR HEAT TRACE SYSTEM

(71) Applicant: Chromalox, Inc., Pittsburgh, PA (US)

(72) Inventors: Mark Crombie, Mount Juliet, TN (US); Adam Heiligenstein, Gibsonia, PA (US)

(73) Assignee: CHROMALOX, INC., Pittsburgh, PA (US)

( * ) Notice: Subject to any disclaimer, the term of this patent is extended or adjusted under 35 U.S.C. 154(b) by 144 days.

(21) Appl. No.: 14/626,160

(22) Filed: Feb. 19, 2015

(65) Prior Publication Data

US 2016/0245447 A1    Aug. 25, 2016

(51) Int. Cl.
*H05B 1/02* (2006.01)
*F16L 53/00* (2006.01)
*H04W 84/18* (2009.01)

(52) U.S. Cl.
CPC ............ *F16L 53/008* (2013.01); *H04W 84/18* (2013.01); *H05B 1/0244* (2013.01); *H05B 1/0291* (2013.01)

(58) Field of Classification Search
CPC .... F16L 53/008; F16L 53/001; H05B 1/0297; H05B 1/0244; E03B 7/12; E03B 11/00; G01F 1/7044; H04W 84/18
USPC ............... 219/494, 497, 483, 486, 213, 535; 392/468
See application file for complete search history.

(56) References Cited

U.S. PATENT DOCUMENTS

| 4,751,495 A | 6/1988 | Whitman |
| 5,475,384 A | 12/1995 | Manenti et al. |
| 5,900,179 A | 5/1999 | Bilenko |

(Continued)

FOREIGN PATENT DOCUMENTS

DE        102013206247 A1    10/2014

OTHER PUBLICATIONS

U.S. Appl. No. 61/865,851, filed Aug. 14, 2013 (17 pages).

(Continued)

*Primary Examiner* — Mark Paschall
(74) *Attorney, Agent, or Firm* — K&L Gates LLP

(57) ABSTRACT

A heat trace system heats (or maintains the temperature of) vessels of a piping system. Heat trace cables are connected to power control devices in respective wireless modules such that when the power control device in a wireless module is on, the heat trace cable connected to that wireless module conducts current, and thereby heats the vessel contacting the heat trace cable. The wireless module receives control commands for controlling its power control device wirelessly from the main power distribution and control system via a wireless communication network. A wireless module can include a sensor, where the wireless module report backs conditions sensed by the sensor to the main power distribution and control system via the wireless network. The main power distribution and control system can use that information in its control loops to control the switching of the power control devices in the wireless modules, to thereby control whether the associated heat trace cable conducts current or not, to thereby control the temperature at the vessel that is heated by the heat trace cable.

15 Claims, 3 Drawing Sheets

(56) References Cited

U.S. PATENT DOCUMENTS

Figure 1:
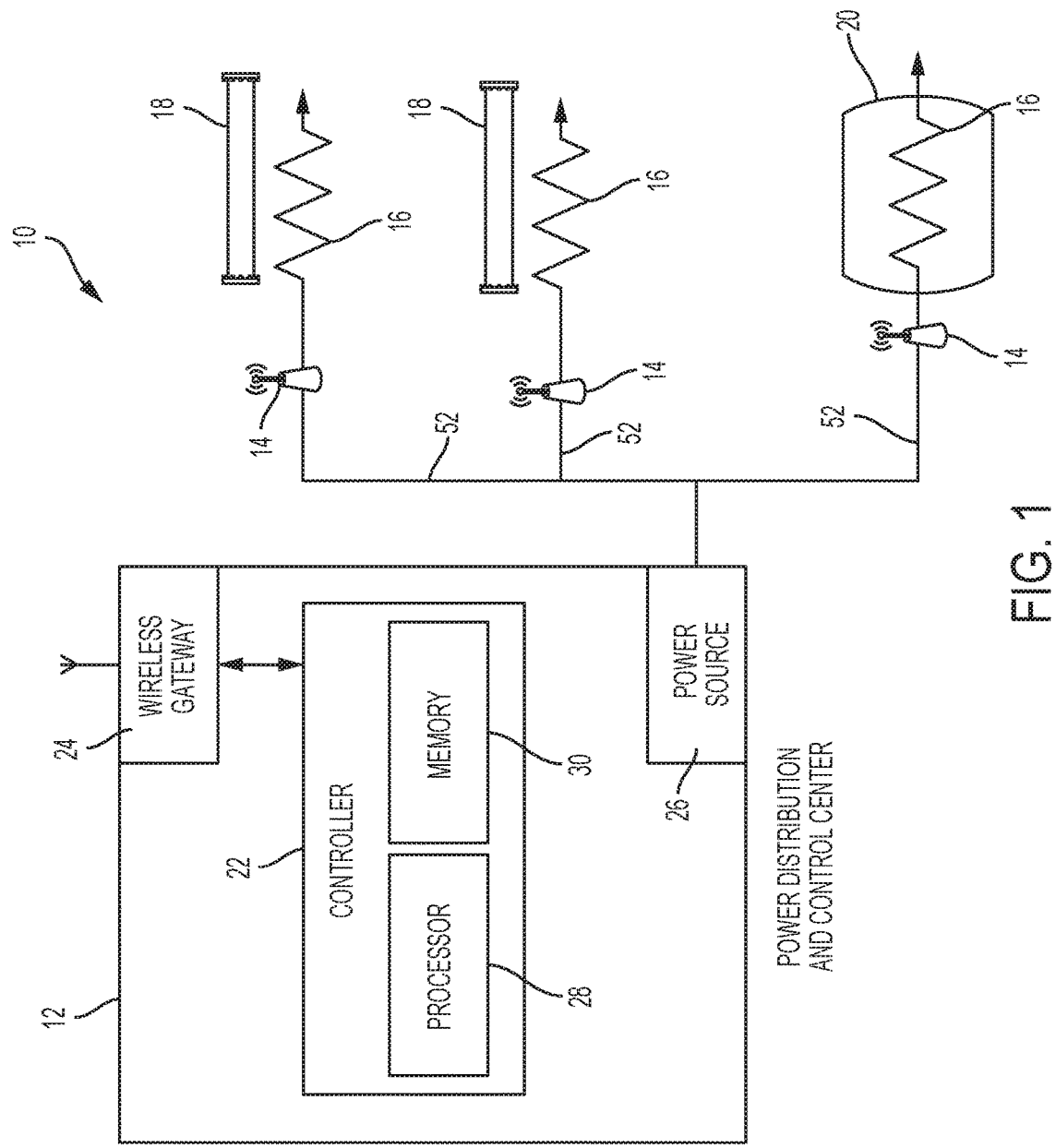

| | | | |
|---|---|---|---|
| 2009/0260438 A1* | 10/2009 | Hedtke | G01H 11/08 73/579 |
| 2011/0163082 A1* | 7/2011 | Mullen | G05B 23/0275 219/494 |
| 2011/0320048 A1* | 12/2011 | Kim | H04Q 9/00 700/282 |
| 2012/0054397 A1* | 3/2012 | Melvin, Jr. | H02J 13/0075 710/300 |
| 2013/0154389 A1* | 6/2013 | Kurs | B60L 3/0069 307/104 |
| 2014/0305930 A1* | 10/2014 | Heizer | G08C 17/02 219/539 |

OTHER PUBLICATIONS

International Patent Application No. PCT/US2014/049591, filed Aug. 4, 2014 (21 pages).
U.S. Appl. No. 14/618,217, filed Feb. 10, 2015 (20 pages).
International Search Report and Written Opinion for PCT/US2016/014152, dated May 3, 2016 (12 pages).

* cited by examiner

WIRELESS MODULES WITH POWER CONTROL CIRCUITS FOR HEAT TRACE SYSTEM

BACKGROUND

Heat trace systems are commonly used in industrial and commercial settings to maintain or raise the temperature of pipes or tanks in a piping system through the use of electrical heating elements or heat traces that are in physical contact with the pipe or tank, as the case may be. Typically, the various heat traces are connected to, and receive electric power from, a main power distribution system. The main power distribution system typically has a user interface that allows the user to configure the parameters of the heat trace system, such as the set point temperatures, the deadbands (a range over which the temperature is allowed to fluctuate), and high/low temperature alarms. The main power distribution system typically includes a solid state relay (SSR) connected to each heat trace loop, and regulation of the SSR regulates the voltage applied to the heat trace loops (which thereby controls the temperatures of the pipes and tanks).

Some heat trace systems also include wireless sensors or other wireless modules throughout the heat trace system. The sensors can sense conditions of the heat traces and/or the pipes/tanks and report the sensed conditions to the main power distribution system via a wireless communication network. Typically these wireless modules are powered by either batteries or separate power cables.

SUMMARY

In one general aspect, the present invention is directed to a heat trace system for heating (or maintain the temperature of) vessels of a piping system, where the power control devices for the heat trace cables at the main power distribution and control system are eliminated, and instead replaced with power control devices at wireless modules (e.g., wireless sensor modules) that are distributed throughout the heat trace system. The heat trace cables are connected to the power control devices in respective wireless modules such that when the power control device in a wireless module is on (conductive), the heat trace cable connected to that wireless module conducts current, and thereby heats the vessel contacting the heat trace cable. Further, the wireless module can receive control commands for controlling its power control device wirelessly from the main power distribution and control system via a wireless communication network. Still further, one or more of the wireless modules can include a sensor (e.g., a temperature sensor, a flow sensor, a pH sensor, a level sensor, etc.). In such cases, the wireless module can report back the conditions sensed by the sensor to the main power distribution and control system via the wireless network. Still further, the main power distribution and control system can use that information (e.g., sensed temperatures) in its control loops to control the switching of the power control devices in the wireless modules, to thereby control whether the associated heat trace cable conducts current or not, to thereby control the temperature at the vessel that is heated by the heat trace cable.

These and other benefits of the present invention will be apparent from the description that follows.

FIGURES

Figure 2:
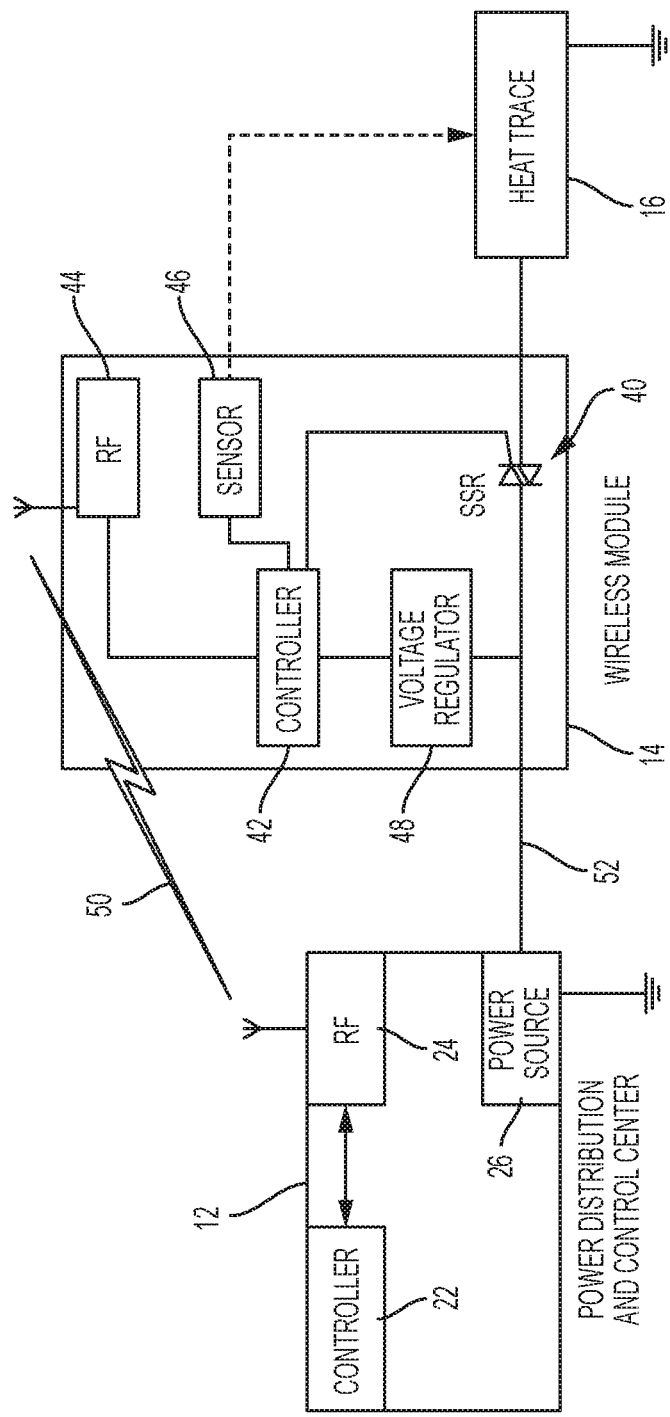
Figure 3:
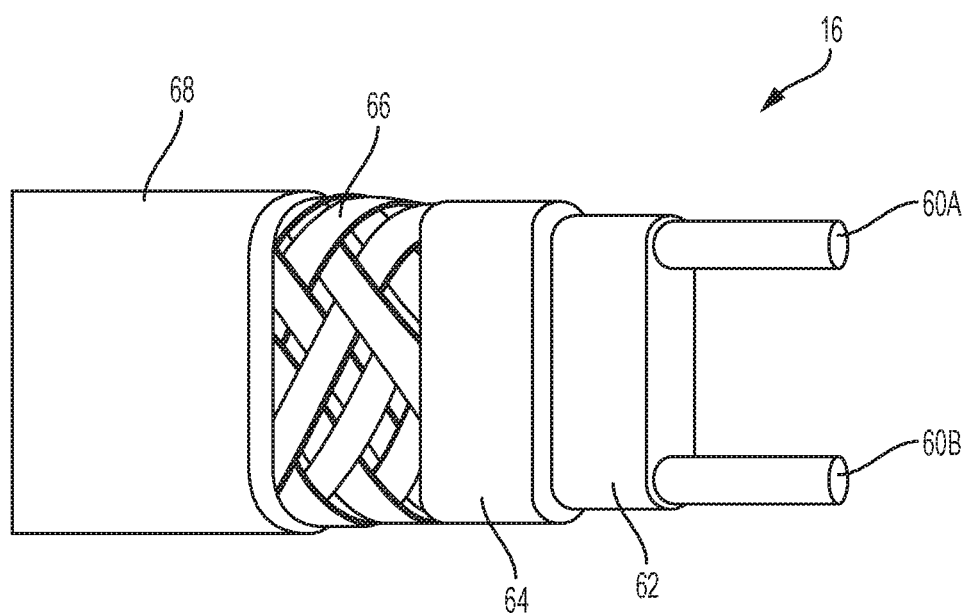

Various embodiments of the present invention are described herein by way of example in conjunction with the following figures, wherein:

FIGS. 1 and 2 are diagram of a heat trace system according to various embodiments of the present invention; and FIG. 3 depicts aspects of a heat trace cable.

DESCRIPTION

With reference to FIGS. 1 and 2, aspects of the present invention are directed generally to a heat trace system 10 where the power control devices (e.g., SSRs) for the heat trace cables 16 at the main power distribution and control system 12 are eliminated and replaced with power control devices 40 at the wireless modules (e.g., wireless sensor modules) 14 throughout the heat trace system 10. Each heat trace cable 16 is connected to the power control device 40 in its associated wireless module 14 such that when the power control device 40 in the wireless module 14 is on (conductive), the heat trace cable 16 connected to it conducts current, and thereby heats the pipe section 18 or tank 20 contacting the heat trace cable 16. Further, the wireless module 14 can receive control commands for controlling its power control device 40 wirelessly from the main power distribution and control system 12 via a wireless data network 50. Also, in cases where the wireless module 14 includes a sensor (e.g., a temperature sensor, a flow sensor, a pH sensor, a level sensor, etc.), the wireless module 14 can report back the sensed conditions to the main power distribution and control system 12 via the wireless network 50, and the main power distribution and control system 12 can use that information as necessary in its control loops to control the current to the heat trace cables 16 (e.g., control whether the power control devices 40 in the wireless modules 14 are conductive or not (on or off)).

The heat trace system 10 illustrated in FIGS. 1 and 2 includes a main power distribution and control center 12, a number of wireless modules 14 (also referred to herein as "wireless field devices"), and a number of heat trace cables 16. Each heat trace cable 16 is adjacent to and contacts an associated fluid (gas or liquid)-carrying vessel, e.g., a pipe section 18 or a tank 20, of the piping system to heat the pipe section 18 or tank 20, as the case may be. For purposes of illustration, FIG. 1 shows two pipe sections 18 and one tank 20 that are each heated with a separate, respective heat trace cable 16, which are shown schematically in FIG. 1 as resistors. Of course, in an industrial setting, the piping system where a heat trace system according to the present invention is employed is likely to have multiple pipe sections and/or tanks to be heated, and each may have one or more associated heat trace cables that are powered as described herein.

As shown in the example of FIGS. 1 and 2, the main power distribution and control center 12 comprises a controller 22, a wireless gateway 24, and an electrical power source 26. The controller 22 may be implemented as a smart, microprocessor-based, computer device (or a network of such devices) that, through programming, controls the operation of the heating system, including controlling the current applied to the heat trace cables 16 (to thereby control the heating therefrom). In that connection, the controller 18 may comprise at least one microprocessor 28 and at least one semiconductor memory unit 30. The memory unit 30 stores instructions, e.g., software or firmware, that is executed by the processor 28. Among other things, the controller 22 determines when to turn on and off the power control devices 40 in the wireless modules 14 that control the current supplied to the various heat trace cables 16. The controller 22 can include a PID controller that controls the on/off cycles of the power control devices 40 of the wireless modules 14 based on, among other things, temperatures at the pipe sections 18 sensed by the wireless modules 14 and reported back to the main power distribution and control system 12 via the wireless network 50 to keep the temperature of the pipe sections 18 at desired (set) levels. The control instructions are transmitted from the controller 22 of the main power distribution and control center 12 via the wireless network 50 to the appropriate wireless module 14 by the wireless gateway 24 of the main power distribution and control center 12.

The wireless network 50 may be, for example, a self-organizing, self-healing wireless mesh communication network. The wireless mesh communication network could be based on the IEEE 802.11 standards, the IEEE 802.15.4 standards, or the ISA-100.11a standard, for example. In that connection, the wireless gateway 24 may be a circuit, implemented in hardware and/or software, that provides a wireless connection for the main power distribution and control center 12 to the wireless network 50. In various embodiments, the wireless gateway 24 may be, for example, a WirelessHART Gateway from Pepperl+Fuchs. Each wireless module 14 can have a unique address on the network 50 that the wireless gateway 24 uses when sending communications via the network 50 to the individual wireless modules 14. Similarly, the wireless gateway has a unique address that the wireless modules 14 use when communicating with the wireless gateway 24 via the network 50.

The power source 26 may include AC mains power, e.g., 100-480 VAC single or three phase, with the AC current from the power source 26 carried to the wireless modules 14 via conductive wires 52. In various embodiments, the alternating current from the power source 26 that is supplied to the heat trace cables 16 is not rectified such that the heat trace cables 16 conduct alternating current (e.g., 100-480V). The voltage regulators 48 of the wireless modules 14 (described further below) may convert the AC current from the power source 26 to appropriate low, control DC voltage(s) for powering components of the wireless module 14.

The main power distribution and control center 12 may also include other features and components that are not shown in FIGS. 1 and 2 for the sake of clarity, such as a touch-screen user interface (or other human-machine interface (HMI)) that allows a user to program the desired heat levels for each heat trace cable 16 being controlled by the main power distribution and control center 12, a ground fault circuit interrupter (GFI), a panel board, etc.

The power control devices 40 of the wireless modules 14 may be any suitable power control device that switches on or off when an external voltage is applied to its control (or gate) terminals, such as a solid state relay (SSR), triac, silicon controlled rectifier (SCR), contactor, etc. The power control device has an input terminal connected via a wire 52 to the electrical power source 26 of the main power distribution and control center 12, and its output is connected to one of the heat trace cables 16. Its gate or control terminal is connected to a controller 42 of the wireless module 14, such that the power control device 40 is controlled (e.g., turned on and off) by the controller 42 (referred to in the claims as a "field device controller" to distinguish it in the claims from the controller 22 of the main power distribution and control center 12). As such, when the power control device 40 is on (conductive), as controlled by the controller 42, the heat trace cable 16 connected to the output of the power control device 40 of the wireless module 14 is connected to and receives electric power from the electric power source 26 in the main power distribution and control center 12.

As shown in the example of FIG. 3, the heat trace cables 16 may each include two buss wires 60A, 60B surrounded by a conductive matrix 62 (which is preferable polymeric). The conductive matrix 62 in turn may be surrounded a jacket 64, which may be surrounded by a metallic (e.g., tinned copper) braid 66 and an overcoat over braid 68 (preferably Teflon). The buss wires 60A, 60B carry electrical current from the power source 26 of the main power distribution and control system 12 when the power control device 40 in the wireless module 12 to which the heat trace cable 40 is connected to is on (e.g., conductive). Heat from a heat trace cable 16 heats (or maintains the temperature of) the pipe section 18 or tank 20 that it contacts to offset any losses in the pipe or tank temperature. More details about the heat trace cables can be found in U.S. provisional patent application Ser. No. 61/865,851, filed Aug. 14, 2013, which is incorporated herein by reference in its entirety.

The controller 42 may be implemented as a microcontroller or other suitable electronic circuit or device that is programmed to control the power control device 40 and perform the other functions ascribed to the controller 42 that are described herein. The control signal from the controller 42 may be coupled to the power control device 40 in a manner that provides galvanic isolation. For example, the power control device 40 may be a SSR that uses optical coupling. In such cases, the control circuit may include an internal LED that illuminates (when on) and switches on a corresponding photo-sensitive diode at the gate terminal of the power control device 40 to turn the power control device 40 on (make it conduct current from its input (the electrical power source 26) to its output (the heat trace cable 16)).

As shown in FIG. 2, the wireless modules 14, in addition to the controller 42, may include a voltage regulator 48, an RF module 44, and a sensor 46. The voltage regulator 48 can convert the voltage from the power source 26 on the wire 52 to a suitable voltage (e.g., 3.3V) for powering the controller 42. The voltage regulator 48 (or another voltage regulator) can also produce supply voltages for the RF module 44 and sensor 46 if necessary. The RF module 44 is an electronic circuit or device that is in communication with the controller 42 and used to transmit and receive wireless communications via the wireless network 50, using the communication protocol of the network 50 (e.g., IEEE 802.11 or WirelessHART), so that the wireless module 14 can communicate wirelessly with the main power distribution and control system 12.

The sensor 46 can sense some external characteristic or quality of the heat trace or piping system. The sensor 46 is in communication with the controller 42. The controller 42 may received the sensed parameters from the sensor 46 and report them to the main power distribution and control system 12 via the RF module 44 (and wireless network 50). In particular, the sensor 46 in one or more of the wireless modules 14 could be a temperature sensor, such as a RTD, that senses the temperature at the associated pipe section 18 or tank 20 of the piping system that is heated by the heat trace cable 16 connected to the wireless module. The controller 22 of the main power distribution and control system 12 can use the sensed temperatures at the pipe section or tank (reported to it wirelessly by the wireless module 14) in a control loop to control the power control device 40 at the wireless module 14, to thereby control the current to the connected heat trace cable 16, to thereby control the temperature at the pipe section 18 or tank 20 heated by the heat trace cable 16.

Other wireless modules 14 in the heat trace system 10 could have other types of sensors. For example, in such other wireless module 14 the sensor 46 could be a flowmeter, a vibration sensor, a pH monitor, a tank level sensor, a valve position sensor, etc. A flowmeter senses the fluid flow in a pipe section and could comprise a differential pressure flowmeter, a magnetic flowmeter, a vortex flowmeter, or any other suitable type of flowmeter. A wireless module 14 having such a flowmeter may periodically transmit wirelessly the measured fluid flow for its associated pipe section 18 to the main power distribution and control system 12. A vibration sensor can sense vibration of an associated pipe section 18. The vibration sensor 212 may comprise, for example, one or more accelerometers for detecting movement due to vibrations in one or more directions (or degrees of freedom). A wireless module 14 having such a vibration sensor may periodically transmit wirelessly the measured vibration levels for its pipe section 18 to the main power distribution and control system 12. A pH monitor can sense the pH level of the fluid in the tank 20 and a wireless module 14 having such a pH monitor can periodically transmit wirelessly the measured pH levels to the main power distribution and control system 12. A level sensor can sense the level of the fluid in the tank 20 and a wireless module 14 having such a level sensor can periodically transmit wirelessly the measured fluid levels in the tank 20 to the main power distribution and control system 12. The level sensor can comprise, for example, a tank fluid measurement device and/or a level switch. Tank level measurement devices can use non-contact level measuring technologies such as radar to detect the level of the fluid in the tank. Tank level switches are triggered when the fluid in the tank reaches a pre-established level. A valve position sensor can detect the position of a valve (not shown) in the piping system and a wireless module 14 having such a valve sensor can periodically transmit wirelessly the valve position status to the main power distribution and control system 16.

In one general aspect, therefor, the present invention is directed to a heat trace system 10 for heating vessels 18, 20 of a piping system. The heat trace system 10 comprises a main power distribution and control unit 12, a plurality of heat trace cables 16, and a plurality of wireless field devices 14. The main power distribution and control unit 12 comprises an electrical power source 26, a wireless communication gateway 24, and a front-end controller 22 in communication with wireless communication gateway 24. Each heat trace cable 16 is adjacent to a vessel 18, 20 of the piping system to heat, or to maintain the temperature of, the vessel. Each wireless field devices comprises a power control device 40, an RF module 44, and a field device controller 42. The power control device comprises an input connected to the electrical power source 26 of the main power distribution and control unit 12, and comprises an output connected to an associated heat trace cable 16, such that when the power control device 40 is ON, the associated heat trace cable 16 conducts current from the electrical power source 26 of the main power distribution and control unit 12. The RF module 44 communicates with the wireless communication gateway 24 of the main power distribution and control unit 12 via a wireless communication network 50. The field device controller 42 controls the power control device 40 based on control data sent from the front end controller 22 of the main power distribution and control unit 12 via the wireless communication network 50 to the wireless field device 14 and received by the RF module 44.

In various implementations, at least one of the wireless field devices further comprises a sensor. The field device controller of that wireless field device is in communication with the sensor and transmits sensed data from the sensor via the RF module and the wireless communication network to the front-end controller of the main power distribution and control unit. The sensor could be a temperature sensor, a flowmeter, a vibration sensor, a pH sensor, a tank level sensor, or a valve position sensor, for example. The power control device may comprise a solid state relay, for example. The wireless communication network may comprise a wireless mesh network.

At least some of the embodiments described herein may be implemented in many different embodiments of software, firmware, and/or hardware. The software and firmware code may be executed by a processor circuit or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components.

Moreover, the processes associated with the present embodiments may be executed by programmable equipment, such as computers or computer systems. Software that may cause programmable equipment to execute processes may be stored in any storage device, such as, for example, a computer system (nonvolatile) memory, RAM, ROM, Flash Memory, etc.

In various embodiments disclosed herein, a single component may be replaced by multiple components and multiple components may be replaced by a single component to perform a given function or functions. Except where such substitution would not be operative, such substitution is within the intended scope of the embodiments.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A heat trace system for heating vessels of a piping system, the heat trace system comprising:
    a main power distribution and control unit that comprises:
        an electrical power source;
        a wireless communication gateway;
        a front-end controller in communication with wireless communication gateway;
    a plurality of heat trace cables, wherein each heat trace cable is adjacent to a vessel of the piping system; and
    a plurality of wireless field devices, wherein each of the plurality of wireless field devices comprises:
        a sensor;
        a power control device having an input connected to the electrical power source of the main power distribution and control unit, and having an output connected to an associated heat trace cable of the plurality of heat trace cables, such that when the power control device is ON, the associated heat trace cable conducts current from the electrical power source of the main power distribution and control unit;

an RF module for communicating with the wireless communication gateway of the main power distribution and control unit via a wireless communication network; and a field device controller in communication with the RF module, the sensor, and the power control device, wherein the field device controller is for transmitting sensed data from the sensor via the RF module and to the wireless communication network to the front-end controller of the main power distribution and control unit; and controlling the power control device based on control data sent from the front end controller of the main power distribution and control unit via the wireless communication network to the wireless field device and received by the RF module, wherein the front-end controller determines the control data based on the sensed data from the sensor transmitted to the front-end controller.

2. The heat trace system of claim 1, wherein:
at least one of the wireless field devices further comprises a sensor that is in communication with the field device controller; and
the field device controller transmits sensed data from the sensor via the RF module and the wireless communication network to the front-end controller of the main power distribution and control unit.

3. The heat trace system of claim 1, wherein:
the sensor comprises a temperature sensor that senses temperature at a vessel of the piping system that is proximate to the associated heat trace cable for the wireless field device; and
the field device controller transmits sensed temperature data from the temperature sensor via the RF module and the wireless communication network to the front-end controller of the main power distribution and control unit.

4. The heat trace system of claim 3, wherein the temperature sensor comprises a RTD.

5. The heat trace system of claim 1, wherein the sensor is a sensor selected from the group consisting of a temperature sensor, a flowmeter, a vibration sensor, a pH sensor, a tank level sensor, and a valve position sensor.

6. The heat trace system of claim 1, wherein the power control device comprises a solid state relay.

7. The heat trace system of claim 1, wherein the wireless communication network comprises a wireless mesh network.

8. A wireless field device for use in a heat trace system, the wireless field device comprising:
a sensor;
a power control device having an input for connection to an electrical power source of a main power distribution and control unit of the heat trace system, and having an output for connection to an associated heat trace cable of the heat trace system, such that when the power control device is ON, the associated heat trace cable conducts current from the electrical power source of the main power distribution and control unit;
an RF module for communicating with the main power distribution and control unit via a wireless communication network; and a field device controller in communication with the RF module, the sensor, and the power control device, wherein the field device controller is for:
transmitting sensed data from the sensor via the RF module and the wireless communication network to the front-end controller of the main power distribution and control unit; and
controlling the power control device based on control data sent from the main power distribution and control unit via the wireless communication network to the wireless field device and received by the RF module, wherein the control data is determined by front-end controller based on the sensed data from the sensor transmitted to the front-end controller.

9. The wireless field device of claim 8, further comprising a sensor that is in communication with the field device controller, wherein the field device controller is for transmitting sensed data from the sensor via the RF module and the wireless communication network to the main power distribution and control unit.

10. The heat trace system of claim 8, wherein:
the sensor comprises a temperature sensor that senses temperature at a vessel of the piping system that is proximate to the associated heat trace cable for the wireless field device; and
the field device controller transmits sensed temperature data from the temperature sensor via the RF module and the wireless communication network to the main power distribution and control unit.

11. The heat trace system of claim 8, wherein the sensor is a sensor selected from the group consisting of a temperature sensor, a flowmeter, a vibration sensor, a pH sensor, a tank level sensor, and a valve position sensor.

12. A method for energizing heat trace cables in a heat trace system that heat vessels in a piping system, the heat trace system comprising:
receiving sensing, by a sensor of a wireless field device of the heat trace system, a condition of the heat trace system;
wirelessly transmitting the sensed condition from the wireless field device to a main power distribution and control unit of the heat trace system via the wireless communication network; by the wireless field device, via a wireless communication network from the main power distribution and control unit of the heat trace system, a control command to turn on a power control device of the wireless field device of the wireless field device, wherein the power control device comprises an input connected to an electrical power source of the main power distribution and control unit, and having an output connected to an associated heat trace cable of the heat trace system; and
in response to receiving the control command, turning on, by a controller of the wireless field device, the power control device such that the associated heat trace cable conducts current from the electrical power source of the main power distribution and control unit.

13. The method of claim 12, further comprising:
sensing, by a sensor of the wireless field device, a condition of the heat trace system; and
wirelessly transmitting the sensed condition from the wireless field device to the main power distribution and control unit via the wireless communication network.

14. The method of claim 13, further comprising the main power distribution and control unit transmitting the control command to the wireless field device based on the sensed condition determined to the main power distribution and control unit; and transmitting the control command to the wireless field device.

15. The method of claim 14, wherein the sensor comprises a temperature sensor and the sensed condition comprises a temperature at a vessel proximate to the associated heat trace cable.

* * * * *